G. H. SMITH.
BEET TOPPER.
APPLICATION FILED NOV. 7, 1916.
1,354,857.
Patented Oct. 5, 1920.
2 SHEETS—SHEET 1.
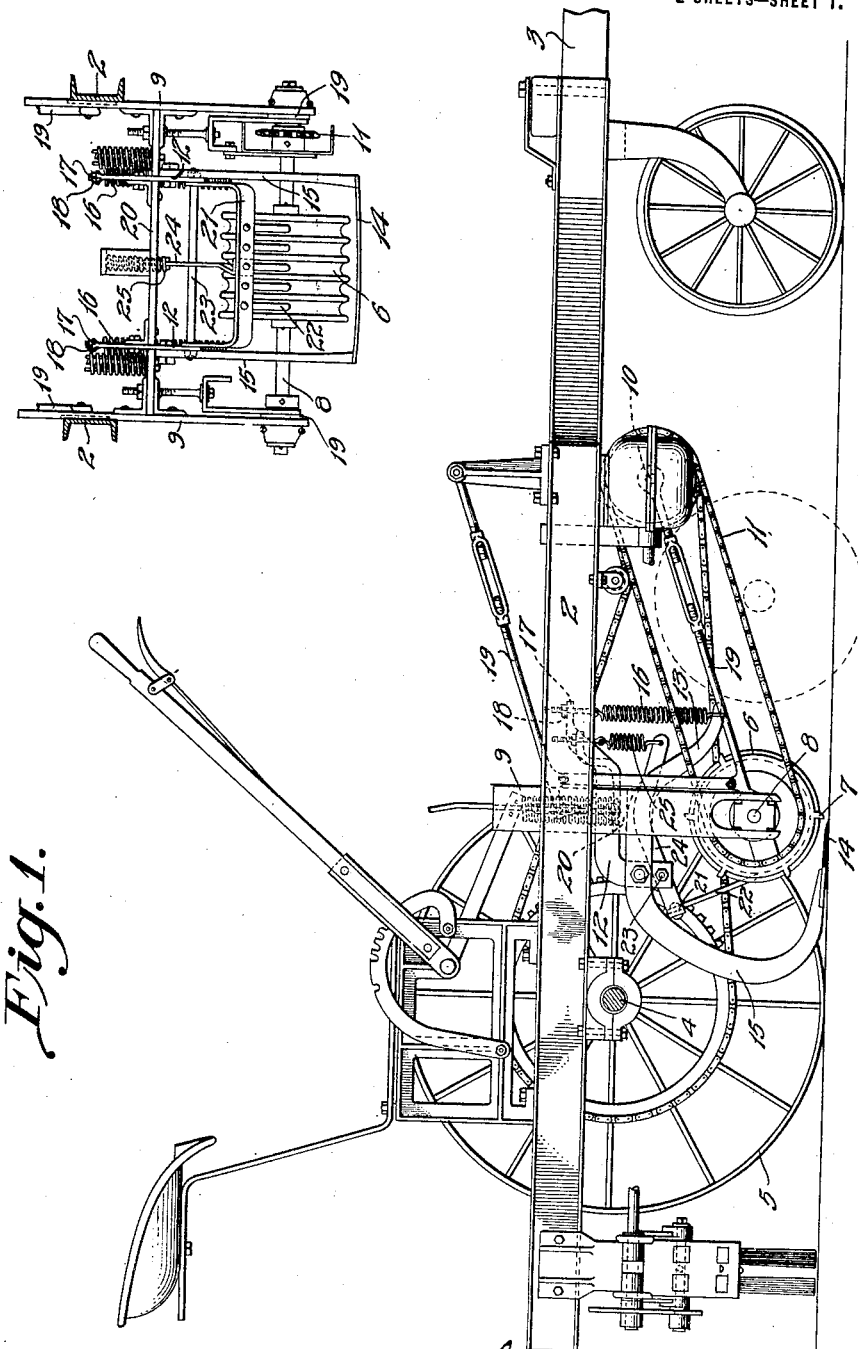

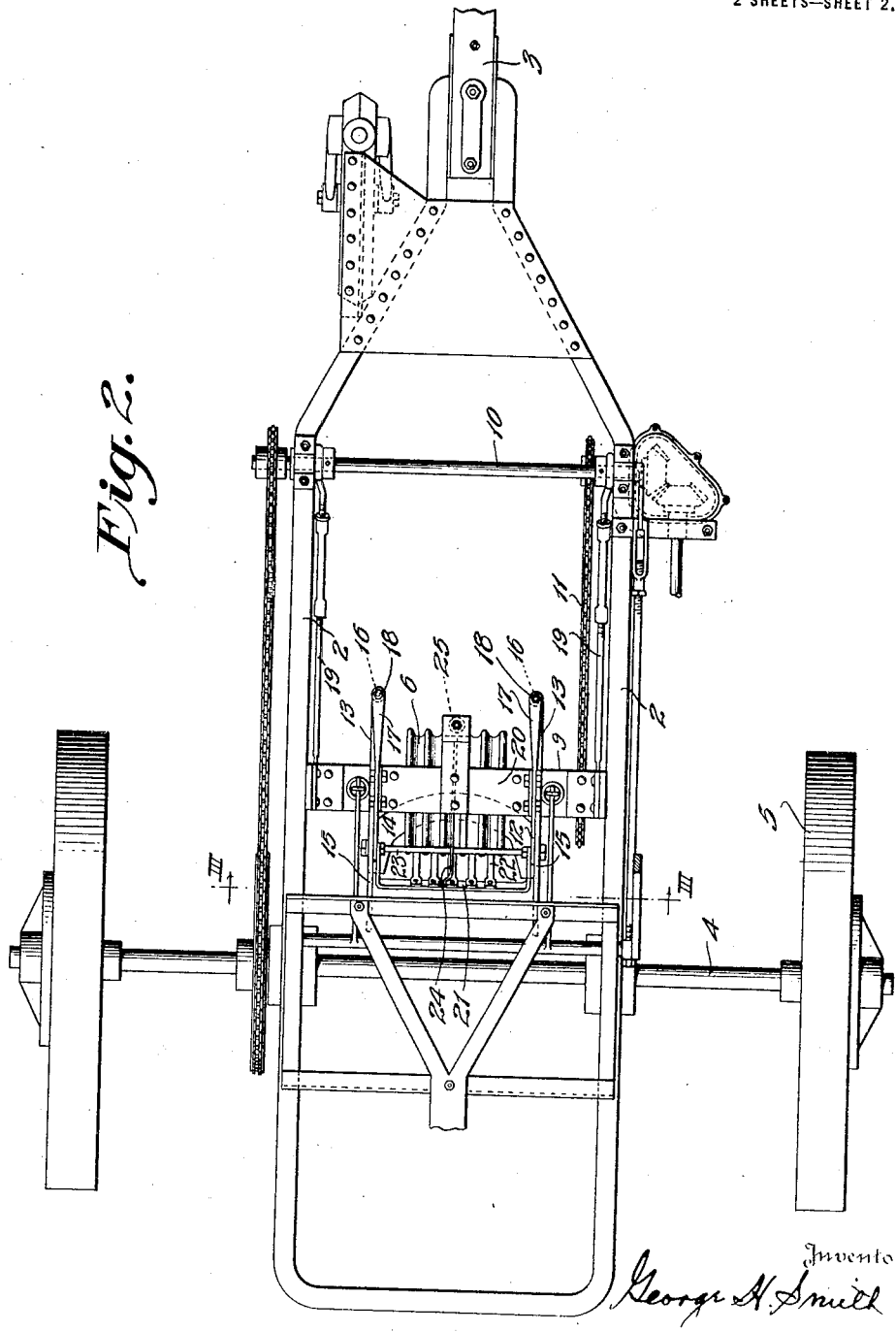

UNITED STATES PATENT OFFICE.

GEORGE H. SMITH, OF COLUMBUS, OHIO.

BEET-TOPPER.

1,354,857.  Specification of Letters Patent.  Patented Oct. 5, 1920.

Application filed November 7, 1916. Serial No. 130,029.

*To all whom it may concern:*

Be it known that I, GEORGE H. SMITH, a citizen of the United States, residing at Columbus, in the county of Franklin and State of Ohio, have invented certain new and useful Improvements in Beet-Toppers, of which the following is a specification, reference being had therein to the accompanying drawing.

This invention relates to beet topping machines of the class in which a gage drum and a topping cutter are mounted in a holder or frame which maintains the topping cutter in horizontal position as the gage rises and falls; it relating particularly to improved means for supporting the knife, the gage, and their holder, in relation to each other and in relation to the other parts.

In the accompanying drawings, Figure 1 is a side elevation of a beet topping machine, embodying my improvements. Fig. 2 is a top plan view of the machine, the driver's seat and its platform being removed. Fig. 3 is a transverse sectional view of the machine taken on the line III—III of Fig. 2.

The machine illustrated has a substantially rectangular main supporting frame comprising side bars 2 that are preferably inclined toward each other toward the front so as to support between them the tongue 3. The main shaft 4 is suitably supported in the frame and carries wheels 5 which are connected with the shaft so as to cause the latter to rotate when the wheels turn forwardly.

6 indicates the usual gage wheel or drum. It may be of any construction, that in the drawings being a corrugated drum or roller provided with projections 7. The drum is supported upon a shaft suitably mounted in the lower portion of the vertically movable frame comprising the vertically slidable uprights 9 and the cross bar 20. The shaft 8 and the drum supported thereon are preferably positively driven, being connected with a drive shaft 10, located transversely in the forward part of the machine, through sprocket chain gearing 11.

The frame 9 is supported so as to be free to move up and down as the gage wheel travels over the surface of the ground and the up-standing beets; and in order to insure that the frame maintains its angular relation to the horizon as it moves, I connect it with the frame of the machine by radius bars 19, 19.

14 designates the topping cutter which is located adjacent to and a little below the gage drum. It is supported so as to be approximately horizontal and is preferably curved, as represented in Fig. 2.

This cutter is supported in the frame 9 so that it moves up and down with the gage drum, the latter serving to determine the plane in which the cutter shall sever the beet tops in a manner well known in this art. It often happens that stones or other hard objects become wedged between the gage drum and the edge of the topping cutter, especially when the gage drum is positively driven and provided with projections 7, with the result that a breakage of parts occurs, or, if its parts are strong enough to withstand the strain, the machine is stopped in its operations. In order to prevent these possible occurrences with the results just indicated, I support the cutter 14, so that when subjected to unusual stress it may move away from the gage drum far enough to permit the escape of whatever hard object may become wedged between it and the drum. I will now describe this support.

15, 15 indicate arms supporting the cutter, pivoted to brackets 12 that extend rearward from the cross bar 20 of the frame 9. The arms 15 extend forward beyond their pivotal supports, as indicated at 13, and have connected to them, springs 16, that are secured at their upper ends to brackets 17, carried by the frame 9. Adjusting means, such as screw-bolts and nuts, are provided for varying the tension of the springs 16, as indicated at 18. The springs are strong enough to hold the topping knife 14, to its work under ordinary conditions, but whenever a hard object becomes stuck between the gage wheel and the knife, and is forced backward against the knife by the revolution of the drum, the springs yield, allowing the knife to swing back and open a space between it and the drum, through which the object caught may escape. As soon as this escape is effected, the springs quickly restore the cutter to working position. In order to hold the cutter in proper position, the forward portions 13 of the arms that support the cutter extend under the cross piece 20 of the vertically movable frame 9, that acts as a stop for the arms. 22 designates a set of cleaning fingers, the ends of which are adapted to lie in the grooves of the gage drum. These are carried by a cross bar 21, supported on a shaft 23 mounted in the brackets 12. An arm 24 is secured fast to, and extends forwardly from, shaft 23, and has secured to its forward end a spring 25, that holds the fingers 22 in engagement with the gage drum, said spring, at its upper end, being attached to a bracket (see Figs. 2 and 3) at the center of the crass bar 20.

The other parts of the machine illustrated in the drawing need not be described, since they form no part of the invention presented in this case.

The mechanism herein presents improvements over the earlier ones in each of which the carrier for the drum and the cutter moves vertically under the control of devices which swing around pivot axes. In the present case the carrier for the drum and the cutter moves freely vertically under controlling devices which maintain them and their carrier in horizontal parallelism; and consequently the action of the cutter upon the beets is always the same, irrespective of whether the plane of the cut is at one distance or another above the surface of the soil, or even below the surface.

This assurance that the cutting will be effected in a horizontal plane is not given where the cutter and the drum swing bodily around a fixed axis. When the gage is lifted upward the cutter is tilted and the resistance to its action by the beets is severe. The cutter blade should be thin, and to have a long blade of that character carried through the stiff, hard, fibrous, upper part or crown portion of the beets, and carried through easily and accurately, requires that the cutter should be maintained in a horizontal plane while it is effecting a cut.

The knife and the drum are held together normally under all ordinary circumstances and move vertically together. But when a predetermined resistance has been reached they separate. And the axis of the pivot of the swinging knife-carrying bars is on a transverse line so related to the axis of the drum that the knife will be quickly and rapidly swung away from the latter when a stone or similar body is to be discharged, and the spring 16 as quickly returns it. The movements are caused so easily and quickly and the backward and forward movements of the knife are so rapid that no standing beets are passed at the times that obstructions are being released from the cutter.

All of the operative parts are firmly braced in the strong main frame, the vertical bars 9 and the crossbars 20 of the swinging frame fitting snugly against but being movable in relation to the side bars of the main frame. These firmly braced vertical bars 9 in turn furnish a strongly braced support for the gage drum and its shaft 8, the bearings of the latter being adjustably fitted in the vertical bars and supported by bolts to the crossbar 20. The bracket bars 12 are firmly held by angle bars to the crossbar 20, and they in turn furnish bracing holders for the knife-supporting bars 15, which are spaced considerably apart to permit the use of a long, thin cutter.

It will be seen that the topping cutter is supported on a horizontal hinge remote from the axis of the drum and on a line above and behind that axis, so that the free end of the cutter will readily move relatively rapidly away from the drum, and the parts are so related in positions that the commencement of the swinging movement of the cutter is approximately in the direction in which the lower part of the drum normally moves; the cutter, however, beginning immediately to recede from the drum. This makes it practically impossible for a stone or other hard object to become tightly wedged or bound between these parts, but easy dislodgment is permitted as the cutter moves rearward relatively to the drum.

Claims—

1. In a machine for severing beet crowns the combination of a vertically movable frame having upright members, a gage drum supported in the lower ends of the said members, a cross-bar between the said members, a topping cutter, brackets supported by the said cross-bar and extending rearward therefrom, arms pivotally connected with said brackets and carrying the topping cutter, the pivots for the said arms being in a horizontal plane above the plane of the axis of the drum and in a transverse vertical plane behind that of said axis, and a spring for holding the cutter in predetermined working relation to the gage drum but permitting it to move rearward when a hard object is forced by the gage drum against the cutter.

2. In a machine for severing beet crowns the combination of a main frame, a vertically movable frame comprising vertical members braced and guided in their movements by the main frame and a cross-bar uniting the said vertical members, a gage drum supported at the lower ends of the vertical members of the movable frame, a topping cutter, brackets carried by said cross-bar and pivotally supporting the cutter, a vertically swinging drum cleaner pivotally supported on said brackets, and springs on said frame for holding the cutter and the cleaner in predetermined positions relative to the drum, and brackets carried by the crossbar for supporting said springs.

3. In a machine for severing tops of root crops, the combination of a rotatable gage adapted to engage with the upper parts of the plants, a vertically movable frame in which the gage is supported, brackets extending rearward from the frame, a cutter for severing the tops of the plants, arms supporting the cutter and pivotally united with the said brackets, the arms extending forward beyond their pivotal connections, and springs engaging with the forward extending portions of the arms operating to hold the cutter in working position with a yielding force.

4. In a machine for severing the tops of root crops, the combination of a main supporting frame, a vertically movable frame, upper and lower radius bars, for connecting the vertically movable frame with the main frame and directing its movements, a rotatable gage mounted in the vertically movable frame, a cutter for severing the tops of the plants pivotally supported in the vertically movable frame, above and to the rear of the gage whereby the cutter may move to the rear and away from the gage, means for holding the cutter in the desired position relative to the gage with a yielding force, and means for positively rotating the gage in a direction to cause its lower portion to move toward the cutter.

In testimony whereof I affix my signature in presence of two witnesses.

GEORGE H. SMITH.

Witnesses:
DAMON E. SHERIDA,
C. D. FAHL.